United States Patent
Lee et al.

(10) Patent No.: US 7,382,080 B2
(45) Date of Patent: Jun. 3, 2008

(54) PIEZOELECTRIC ULTRASONIC MOTOR DRIVER

(75) Inventors: Gui Youn Lee, Seoul (KR); Dong Kyun Lee, Seoul (KR); Jung Ho Ryu, Kyungki-do (KR); Byung Woo Kang, Seoul (KR); Hyoung Jun Jeon, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 378 days.

(21) Appl. No.: 11/139,516

(22) Filed: May 31, 2005

(65) Prior Publication Data

US 2006/0192458 A1   Aug. 31, 2006

(30) Foreign Application Priority Data

Feb. 25, 2005   (KR) ............... 10-2005-0016043

(51) Int. Cl.
*H02N 2/08* (2006.01)
(52) U.S. Cl. ............ 310/323.02; 310/317; 310/316.02; 310/316.01
(58) Field of Classification Search ........... 310/316.02, 310/317, 323.02, 324.04, 323.08, 314, 315
See application file for complete search history.

(56) References Cited

U.S. PATENT DOCUMENTS 2,439,499 A    4/1948  Williams et al.

6,940,209 B2 *  9/2005  Henderson ............. 310/323.02
2002/0003384 A1 *  1/2002  Iino et al. ............. 310/316.02

FOREIGN PATENT DOCUMENTS

| JP | 7-170766 | 7/1995 |
| JP | 08-126357 | 5/1996 |
| JP | 2004-201432 | 7/2004 |

OTHER PUBLICATIONS

Japanese Office Action, with English translation, issued in Japanese Patent Application No. JP 2005-152838, mailed Sep. 4, 2007.

* cited by examiner

*Primary Examiner*—Darren Schuberg
*Assistant Examiner*—Bryan P Gordon
(74) *Attorney, Agent, or Firm*—McDermott Will & Emery LLP

(57) ABSTRACT

The present invention provides a piezoelectric ultrasonic motor driver which can perform self-oscillation, adjust the rotational direction of the motor, and be easy to manufacture. The motor includes a metal body having a desired shape; a plurality of piezoelectric plates attached to surfaces of the metal body, contracted and expanded to rotate the metal body; a self-oscillation unit for oscillating at an electromechanical frequency of the piezoelectric plates an electrical signal; and a delay unit for delaying an oscillation signal of the self-oscillation unit in phase by 90 or −90 degrees according to a desired rotational direction.

3 Claims, 5 Drawing Sheets

PIEZOELECTRIC ULTRASONIC MOTOR DRIVER

RELATED APPLICATION

The present application is based on, and claims priority from, Korean Application Number 2005-16043, filed Feb. 25, 2005, the disclosure of which is incorporated by reference herein in its entirety.

BACKGROUND OF THE INVENTION

1. Field of the Invention

The present invention relates to a piezoelectric ultrasonic motor that includes a metal body and a plurality of piezoelectric plates attached to the metal body and converts simple vibrations of the piezoelectric plates into linear movement, and more particularly to a piezoelectric ultrasonic motor drive circuit that performs four-phase driving of the motor through self-oscillation, achieving a high efficiency, high output operation at any time, regardless of environmental factors.

2. Description of the Related Art

Piezoelectric ultrasonic motors convert simple vibration of piezoelectric ceramic elements, which contract and expand when current is applied thereto, into linear movement so as to serve as rotary motors. Piezoelectric ultrasonic motors are small and light weight. Because they use ultrasonic power, piezoelectric ultrasonic motors cause no noise and little electromagnetic interference. Due to these advantages, piezoelectric ultrasonic motors are typically used in lens drive units of expensive cameras.

Various types of piezoelectric ultrasonic motors have been proposed. FIG. 1 shows an example piezoelectric ultrasonic motor. As shown in FIG. 1, the piezoelectric ultrasonic motor basically comprises a metal body 1 serving as a stator and a plurality of piezoelectric plates 2 to 5 attached to surfaces of the metal body 1. The piezoelectric palates 2 to 5 contract and expand if voltage is applied to the piezoelectric palates 2 to 5 through electrodes 2a to 5a. If a voltage of the same frequency as the electromechanical resonant frequency of each of the piezoelectric plates 2 to 5 is applied to each of the piezoelectric plates 2 to 5, the amplitude of contraction and expansion movement of each of the piezoelectric plates 2 to 5 is maximized.

The plurality of piezoelectric plates 2 to 5 having these characteristics are longitudinally attached to the metal body 1. The number of the piezoelectric plates 2 to 5 varies depending on the shape of the metal body 1 and the used driving scheme. If voltage signals out of phase with each other by certain degrees are applied to the piezoelectric plates 2 to 5, the piezoelectric plates 2 to 5 contract and expand to cause a bending deformation of the metal body 1, thereby rotating the central axis of the metal body 1.

Thus, the piezoelectric ultrasonic motor needs a drive circuit for applying suitable drive signals to the plurality of piezoelectric plates 2 to 5.

FIG. 2 shows a drive circuit of a rod-shaped piezoelectric ultrasonic motor according to a two-phase driving method proposed in U.S. Pat. No. 2,439,499. A transformer 6 transforms a 60 Hz power supply voltage and applies the transformed voltage to piezoelectric plates 2 and 3. A phase shift circuit composed of an inductor 7 and a capacitor 8 shifts the phase of an output voltage of the transformer 6 by 90 degrees and then applies the phase-shifted voltage to piezoelectric plates 4 and 5.

In the drive circuit of FIG. 2, the frequency of drive signal applied to the piezoelectric plates 2 to 5 may vary according to changes in the power supply voltage received from the outside. As described above, the piezoelectric ultrasonic motor can obtain the maximum efficiency and output only when receiving a drive voltage having the same frequency as the electromechanical resonant frequency of the piezoelectric plates 2 and 5. However, the conventional drive circuit of FIG. 2 has a problem in that mass productivity and driving efficiency are reduced if external environmental factors or frequency differences between products cause changes in the resonant frequency.

To overcome this problem, studies have been done to implement a self-oscillation function in the drive circuit so as to apply drive signals of the same frequency as the electromechanical resonant frequency, regardless of environmental factors and frequency differences between products. FIG. 3 shows an improved drive circuit having such a function.

As shown in FIG. 3, the conventional improved drive circuit comprises a feedback resistor Rf and an inverter INV, which are connected in parallel to a piezoelectric ultrasonic motor 30, and capacitors CL1 and CL2 which are connected between the ground and the piezoelectric ultrasonic motor 30. RC oscillation is performed according to capacitances of the capacitors CL1 and CL2, a capacitance caused by the piezoelectric ultrasonic motor 30, and a resistance of the feedback resistor Rf. That is, the oscillation frequency is determined based on the capacitances of the capacitors CL1 and CL2, the capacitance of the piezoelectric ultrasonic motor 30, and the resistance of the feedback resistor Rf. By suitably controlling the capacitances of the capacitors CL1 and CL2 and the resistance of the feedback resistor Rf, it is possible to make the oscillation frequency equal to the electromechanical resonant frequency of the piezoelectric ultrasonic motor 30.

If the oscillation frequency is set equal to the electromechanical resonant frequency of the piezoelectric ultrasonic motor 30 in such a manner, drive signals applied to the piezoelectric motor 30 always have the same frequency as the electromechanical resonant frequency, regardless of environmental factors or differences between parts, so that it is possible to obtain the maximum efficiency and output at any time.

The inverter INV inverts the phases of drive signals to be applied to two piezoelectric plates 32 and 33 or 32 and 34 provided on both sides of the piezoelectric ultrasonic motor 30. This allows drive signals out of phase by 180 degrees to be applied to the two piezoelectric plates 32 and 33 or 32 and 34.

To enable the piezoelectric ultrasonic motor 30 to adjust the rotational direction, the common piezoelectric plate 32 is provided on one surface of a metal body 31, and the two piezoelectric plates 33 and 34 are provided respectively on two divided sections of another surface of the metal body 31, which is opposite to the one surface. The common piezoelectric plate 32 is connected to one end of the inverter INV and the piezoelectric plates 33 and 34 are connected to the other end of the inverter INV through a switch SW.

If the switch SW is controlled to connect the output of the inverter INV to the upper piezoelectric plate 33, the common piezoelectric plate 32 and the upper piezoelectric plate 33 contract and expand to cause a bending deformation in the metal body 31, thereby rotating the metal body 31 clockwise. On the other hand, if the switch SW is controlled to connect the output of the inverter INV to the lower piezoelectric plate 34, the common piezoelectric plate 32 and the lower piezoelectric plate 34 contract and expand to cause a bending deformation in the metal body 31, thereby rotating the metal body 31 counterclockwise.

The piezoelectric ultrasonic motor drive circuit of FIG. 3 uses a two-phase driving scheme as with that of FIG. 2, and can prevent changes in the frequency through self-oscillation. In the conventional drive circuit configured as described above, it is necessary to ground the metal body 31 of the piezoelectric ultrasonic motor 30. However, since the piezoelectric plates 32, 33, and 34 are attached to the metal body 31, it is difficult to form an electrode for grounding the metal body 31. In addition, since the structure of the piezoelectric ultrasonic motor has been altered to allow changes in the rotational direction of the motor, it is difficult to change the rotational direction of a piezoelectric ultrasonic motor having a structure different from that shown in FIG. 3.

SUMMARY OF THE INVENTION

Therefore, the present invention has been made in view of the above problems, and it is an object of the present invention to provide a piezoelectric ultrasonic motor driver which is easy to manufacture and also can perform self-oscillation, can adjust the rotational direction of the motor, and can achieve a high efficiency, high output operation at any time, regardless of environmental factors.

In accordance with the present invention, the above and other objects can be accomplished by the provision of a piezoelectric ultrasonic motor driver comprising: a piezoelectric ultrasonic motor including a metal body having a desired shape, and a plurality of piezoelectric plates attached to surfaces of the metal body, wherein the piezoelectric plates contracts and expands to rotate the metal body if electrical signals are applied to the piezoelectric plates; a self-oscillation unit for oscillating at an electromechanical resonant frequency of the piezoelectric plates and allowing a frequency of an electrical signal applied to one of the plurality of piezoelectric plates to be maintained at the electromechanical resonant frequency of the piezoelectric plates; and a delay unit for delaying an oscillation signal of the self-oscillation unit in phase by 90 or −90 degrees according to a desired rotational direction, and applying the delayed signal to another of the plurality of piezoelectric plates.

The piezoelectric ultrasonic motor driver according to the present invention changes the rotational direction by changing the phase delays of drive signals applied to the piezoelectric plates through the delay unit. The piezoelectric ultrasonic motor driver can be applied to any piezoelectric ultrasonic motor structure.

Preferably, the plurality of piezoelectric plates may include first and second piezoelectric plates disposed at 90 degrees to each other, and may also include first and second piezoelectric plates opposing each other and third and fourth piezoelectric plates opposing each other, the first to fourth piezoelectric plates being provided on the surfaces of the metal body, so that the piezoelectric ultrasonic motor can be driven in two-phase and four-phase driving schemes.

In the case where the plurality of piezoelectric plates include first and second piezoelectric plates disposed at 90 degrees to each other, the self-oscillation unit preferably comprises a first capacitor provided between the first piezoelectric plate and the ground; a second capacitor provided between the metal body of the piezoelectric ultrasonic motor and the ground; a feedback resistor provided between a node between the first capacitor and the first piezoelectric plate and a node between the second capacitor and the metal body; and a first inverter connected in parallel to the feedback resistor. In this case, the delay unit preferably comprises a switch for allowing the oscillation signal of the self-oscillation unit to be output to one of the two selective terminals according to a requested rotational direction; and first and second delayers connected respectively to the two selective terminals of the switch, wherein the first and second delayers delay a voltage signal received through the switch in phase by 90 and −90 degrees, respectively, and provide the delayed signal to the second piezoelectric plate.

In the case where the plurality of piezoelectric plates include first and second piezoelectric plates opposing each other and third and fourth piezoelectric plates opposing each other, the first to fourth piezoelectric plates being provided on the surfaces of the metal body, the self-oscillation unit preferably may comprise a first capacitor, one end thereof being connected to both the first and second piezoelectric plates and the other end being grounded; a second capacitor provided between the metal body of the piezoelectric ultrasonic motor and the ground; a feedback resistor provided between a node between the first capacitor and the first and second piezoelectric plates and a node between the second capacitor and the metal body; and a first inverter connected in parallel to the feedback resistor. In this case, the self-oscillation unit may also comprise a first capacitor provided between the first piezoelectric plate and the ground; a second capacitor provided between the second piezoelectric plate and the ground; a feedback resistor provided between a node between the first capacitor and the first piezoelectric plate and a node between the second capacitor and the second piezoelectric plate; and a first inverter connected in parallel to the feedback resistor. In this case, the delay unit comprises a switch for allowing the oscillation signal of the self-oscillation unit to be output to one of the two selective terminals according to a requested rotational direction; and first and second delayers connected respectively to the two selective terminals of the switch, wherein the first and second delayers delay a voltage signal received through the switch in phase by 90 and −90 degrees, respectively, and provide the delayed signal to both the third and fourth piezoelectric plates. Alternatively, the delay unit comprises a switch for allowing the oscillation signal of the self-oscillation unit to be output to one of the two selective terminals according to a requested rotational direction; first and second delayers connected respectively to the two selective terminals of the switch, wherein the first and second delayers delay a voltage signal received through the switch in phase by 90 and −90 degrees, respectively, and provide the delayed signal to the third piezoelectric plate; and a second inverter for delaying an electrical signal transferred from the first or second delayer to the third piezoelectric plate in phase by 180 degrees and providing the delayed electrical signal to the fourth piezoelectric plate.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

A piezoelectric ultrasonic motor drive circuit according to the present invention will now be described in detail with reference to the accompanying drawings.

Figure 4:
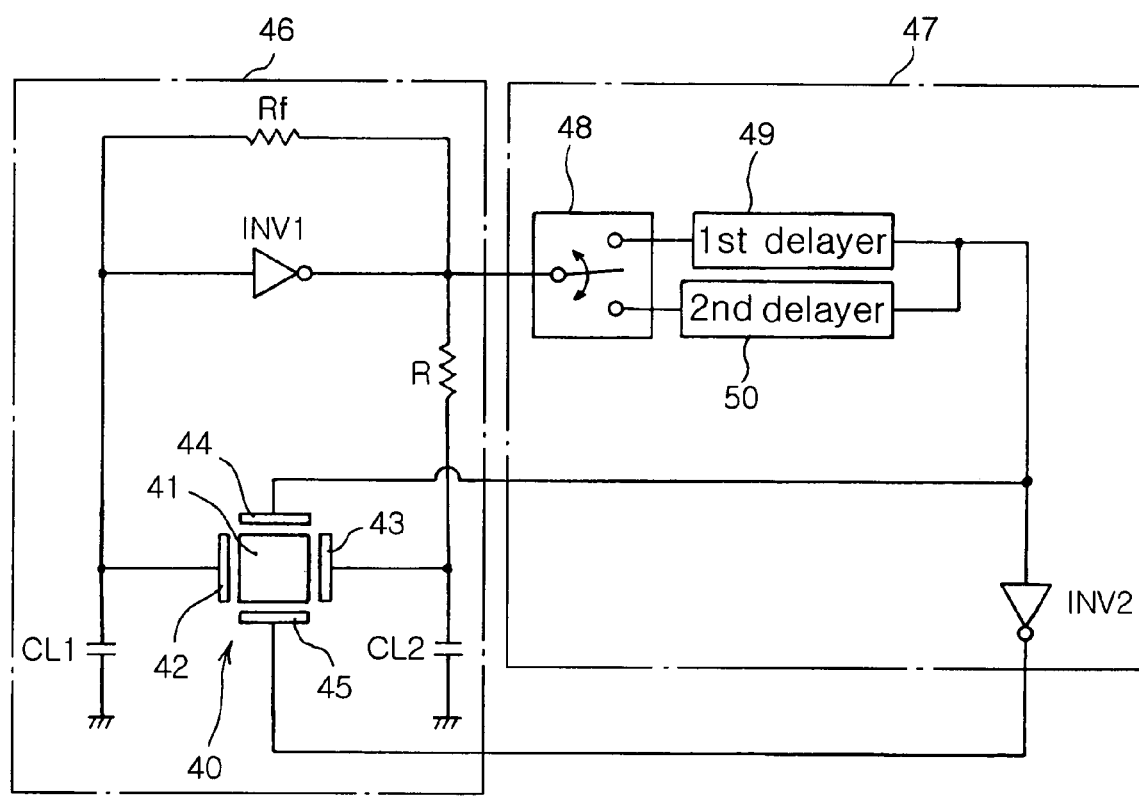
FIG. 4 is a circuit diagram of a piezoelectric ultrasonic motor driver according to a first embodiment of the present invention.

FIG. 4 shows a preferred embodiment of a piezoelectric ultrasonic motor driver according to the present invention. As shown in FIG. 4, the piezoelectric ultrasonic motor driver comprises a piezoelectric ultrasonic motor 40, a self-oscillation unit 46, and a delay unit 47. The piezoelectric ultrasonic motor 40 includes a metal body 41 and a plurality of piezoelectric plates 42 to 45 attached to outer surfaces of the metal body 41. The self-oscillation unit oscillates at the electromechanical resonant frequency of the piezoelectric plates 42 to 45 so that the frequency of electrical signals applied to the piezoelectric plates is maintained at the electromechanical resonant frequency of the piezoelectric plates. The delay unit 47 delays an oscillation signal of the self-oscillation unit 46, which is applied to one of the piezoelectric plates, by 90 or −90 degrees according to a desired rotational direction (i.e., clockwise or counterclockwise) and applies the delayed signal to another of the piezoelectric plates.

Although the piezoelectric ultrasonic motor 40 includes the four piezoelectric plates 42 to 45 in this embodiment, the number of piezoelectric plates may vary depending on the shape of the metal body 41 and the used driving scheme as described above.

Circuitry of the self-oscillation unit 46 and the delay unit 47 may vary depending on whether a four-phase driving scheme or a two-phase driving scheme is employed. The circuitry shown in FIG. 4 is an example implemented using a 4-phase driving scheme.

In the case where the four-phase driving scheme is used, the self-oscillation unit 46 comprises first and second capacitors CL1 and CL2, a feedback resistor Rf, and a first inverter INV1. The first and second piezoelectric plates 42 and 43 of the piezoelectric ultrasonic motor 40, which oppose each other, are grounded through the first and second capacitors CL1 and CL2. One end of the feedback resistor Rf is connected to the first piezoelectric plate 42 of the motor 40 and the other end is connected to the second piezoelectric plate 43 through the resistor R. The first inverter INV1 is connected in parallel to the feedback resistor Rf.

The delay unit 47 comprises a switch 48, first and second delayers 49 and 50, and a second inverter INV2. The switch 48 has a common contact, connected to the output of the first inverter INV1, and two selective terminals. The first and second delayers 49 and 50 are connected respectively to the two selective terminals of the switch 48. Each output of the first and second delayers 49 and 50 is connected to the third piezoelectric plate 44 of the piezoelectric ultrasonic motor 40. The first and second delayers 49 and 50 delay the phases of input signals by 90 and −90 degrees, respectively. The second inverter INV2 inverts the phases of electrical signals transferred from the first and second delayers 49 and 50 to the third piezoelectric plate 44, and provides the inverted signals to the fourth piezoelectric plate 45.

In the embodiment of FIG. 4, there is no need to separately ground the metal body 41, and it is also possible to change the rotational direction simply using the switch 48 and the first and second delayers 49 and 50 without changing the structure of the piezoelectric plates 41 and 45.

The operation of the piezoelectric ultrasonic motor driver according to the present invention will now be described with reference to FIG. 4.

The self-oscillation unit 46 performs RF oscillation according to the capacitances of the capacitors CL1 and CL2 and the piezoelectric ultrasonic motor 30 and the resistance of the feedback resistor Rf. Since the capacitance of the piezoelectric ultrasonic motor 40 is fixed, it is possible to obtain the same oscillation frequency as the electro-mechanical resonant frequency of the piezoelectric ultrasonic motor 40 by adjusting the resistance of the feedback resistor Rf and the capacitances of the first and second capacitors CL1 and CL2.

If an electrical signal is applied to the piezoelectric ultrasonic motor 40, RF oscillation is performed so that a certain-level voltage signal, which is in the form of a sinusoidal wave at the oscillation frequency, is applied to the first piezoelectric plate 42. The first inverter INV1 inverts the phase of the voltage signal applied to the first piezoelectric plate 42 and provides the phase-inverted voltage signal to the second piezoelectric plate 43. Accordingly, the second piezoelectric plate 43 receives a voltage signal which is out of phase with the voltage signal applied to the first piezoelectric plate 42 by 180 degrees and has the same frequency as that of the voltage signal applied to the first piezoelectric plate 42.

Then, the oscillation signal of the self-oscillation unit 46 is applied to one of the first and second delayers 49 and 50 through the switch 48 in the delay unit 47. The first and second delayers 49 and 50 delay input signals in phase by 90 and −90 degrees, respectively.

The electrical signal provided from the self-oscillation unit 46 to the delay unit 47 is delayed in phase by 90 or −90 degrees according to the selection operation of the switch 48.

For example, if the switch 48 selects one of the two selective terminals, which is connected to the first delayer 49, a signal output from the first inverter INV1 is input to the first delayer 49 so that the signal is delayed in phase by 90 degrees. The signal delayed in phase by 90 degrees is applied to each of the second inverter INV2 and the third piezoelectric plate 44 of the piezoelectric ultrasonic motor 40. The second inverter INV2 inverts the phase of the electrical signal applied to the third piezoelectric plate 44 and provides the phase-inverted signal to the fourth piezoelectric plate 45 of the piezoelectric ultrasonic motor 40. That is, two signals out of phase with each other by 180 degrees are applied to the third and fourth piezoelectric plates 44 and 45, respectively.

In this manner, four voltage signals, adjacent signals of which are out of phase by 90 degrees and which have the same frequency (i.e., the oscillation frequency), are sequentially applied to the first to fourth piezoelectric plates 42 to 45. As the four-phase drive signals are applied to the piezoelectric ultrasonic motor 40, bending deformation occurs in the metal body 41, thereby rotating the central axis of the metal body 41.

Next, if the switch 48 selects the other of the two selective terminals, which is connected to the second delayer 50, the oscillation signal of the self-oscillation unit 46 is delayed in phase by −90 degrees through the second delayer 50. The signal delayed in phase by −90 degrees is input to each of the second inverter INV2 and the third piezoelectric plate 44. The second inverter INV2 inverts the phase of the input signal (i.e., delays the phase by 180 degrees) and provides the phase-inverted signal to the fourth piezoelectric plate 45. Accordingly, two signals out of phase with each other by 180 degrees are applied to the third and fourth piezoelectric plates 44 and 45, respectively. Here, the phases of the two signals applied to the third and fourth piezoelectric plates 44 and 45 are opposite to the phases of the two signals applied thereto when the first delayer 49 is selected. Consequently, the piezoelectric ultrasonic motor 40 rotates in the opposite direction to that when the first delayer 49 is selected.

The operation of the piezoelectric ultrasonic motor driver according to the present invention will now be described in more detail with reference to FIGS. 5a to 5d.

Figure 5:
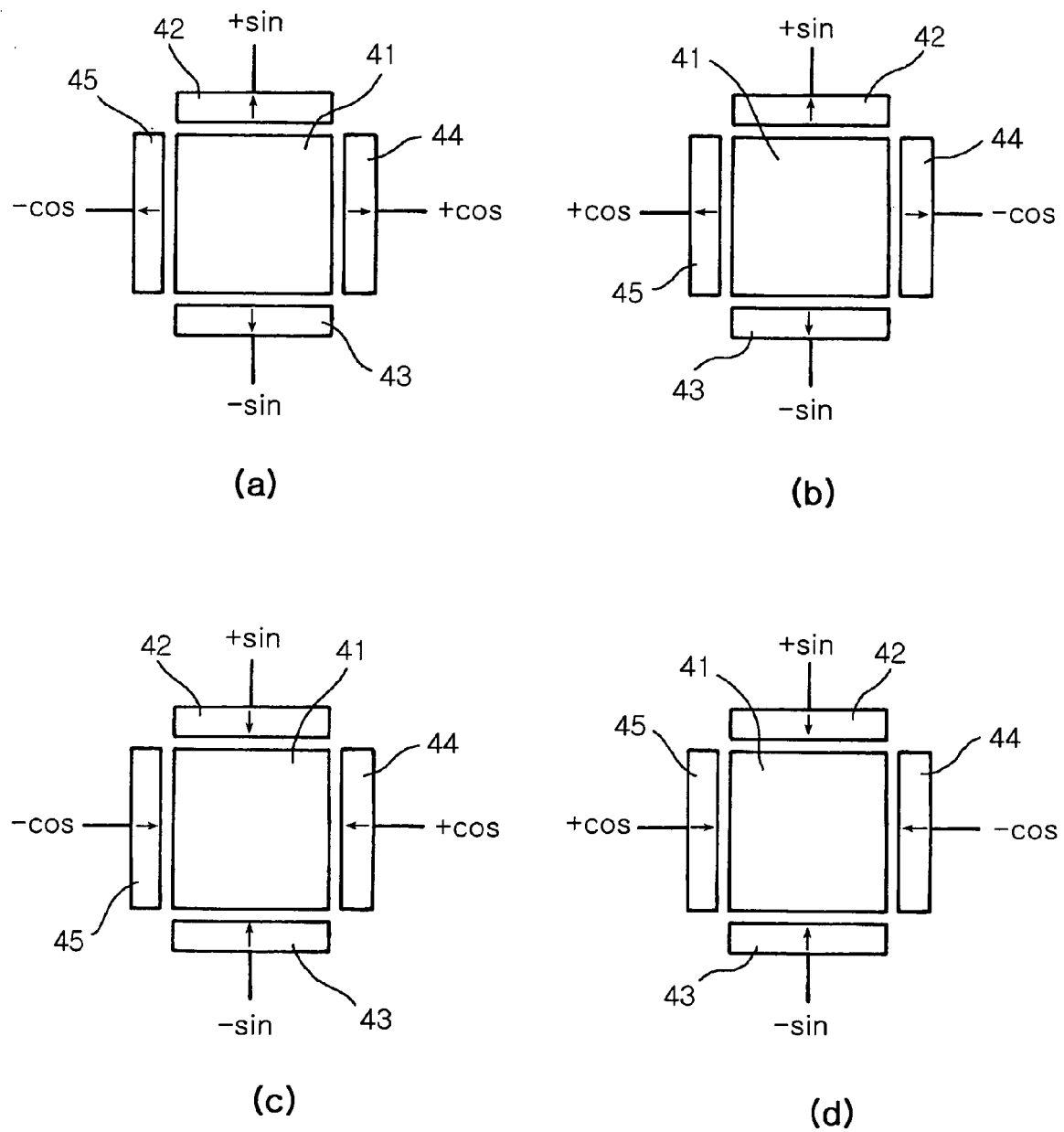
FIGS. 5a to 5d illustrates the relationship between drive signals and the direction of polarization of piezoelectric plates provided in a piezoelectric ultrasonic motor according to the first embodiment of the present invention.

FIGS. 5a to 5d illustrate drive signals that the drive circuit according to the present invention provides to the piezoelectric ultrasonic motor 40. FIGS. 5a and 5c show examples in which the switch 48 selects the first delayer 49, and FIGS. 5b and 5d show examples in which the switch 48 selects the second delayer 50. FIGS. 5a and 5b show examples in which the direction of polarization in the first to fourth piezoelectric plates 42 to 45 are from the center of the metal body 41 to the outside, and FIGS. 5c and 5d show examples in which the direction of polarization in the first to fourth piezoelectric plates 42 to 45 are from the outside to the center of the metal body 41.

First, if the switch 48 selects the first delayer 49, as shown in FIG. 5a, a positive sine wave signal (+sin), a positive cosine wave signal (+cos), a negative sine wave signal (−sin), and a negative cosine wave signal (−cos), adjacent signals of which are out of phase by 90 degrees, are applied respectively to the first, third, second, and fourth piezoelectric plates 42, 44, 43, and 45 in clockwise order. On the other hand, if the switch 48 selects the second delayer 50, as shown in FIG. 5b, a positive sine wave signal (+sin), a positive cosine wave signal (+cos), a negative sine wave signal (−sin), and a negative cosine wave signal (−cos), adjacent signals of which are out of phase by 90 degrees, are applied respectively to the first, fourth, second, and third piezoelectric plates 42, 45, 43, and 44 in counterclockwise order. In this manner, the piezoelectric ultrasonic driver shown in FIG. 4 applies the four-phase drive voltage signals, adjacent signals of which are out of phase by 90 degrees, to the four piezoelectric plates 42 to 45, respectively, so that bending deformation occurs in the metal body 41 in the piezoelectric ultrasonic motor 40, thereby rotating a rotor (not shown) coupled to the central axis of the metal body 41. As the phases of drive signals applied to the third and fourth piezoelectric plates 44 and 45 are changed according to the selection of the switch 48 as shown in FIGS. 5a and 5b, the rotational direction of the piezoelectric ultrasonic motor 40 is changed to clockwise or counterclockwise.

The piezoelectric ultrasonic motors 40 shown in FIGS. 5c and 5d have the same operating principle as those of FIGS. 5a and 5b, except that the direction of polarization of FIGS. 5c and 5d is opposite to that of FIGS. 5a and 5b. Specifically, if the switch 48 selects the first delayer 49, as shown in FIG. 5c, a positive sine wave signal (+sin), a positive cosine wave signal (+cos), a negative sine wave signal (−sin), and a negative cosine wave signal (−cos) adjacent signals of which are out of phase by 90 degrees, are applied respectively to the first, third, second, and fourth piezoelectric plates 42, 44, 43, and 45 in clockwise order. On the other hand, if the switch 48 selects the second delayer 50, as shown in FIG. 5d, a positive sine wave signal (+sin), a positive cosine wave signal (+cos), a negative sine wave signal (−sin), and a negative cosine wave signal (−cos), adjacent signals of which are out of phase by 90 degrees, are applied respectively to the first, fourth, second, and third piezoelectric plates 42, 45, 43, and 44 in counterclockwise order. As the four-phase drive voltage signals are applied to the four piezoelectric plates 42 to 45, bending deformation occurs in the metal body 41 in the piezoelectric ultrasonic motor 40, thereby rotating the central axis of the metal body 41. Since the direction of polarization of the first to fourth piezoelectric plates 42 to 45 is opposite to that of FIGS. 5a and 5b, the metal body 41 is subjected to bending deformation opposite to that of FIGS. 5a and 5b under the same condition. Thus, if drive signals in the same states as in FIGS. 5a and 5b are applied to the first to fourth piezoelectric plates 42 to 45, the rotational direction of the piezoelectric ultrasonic motor 40 is opposite to that of FIGS. 5a and 5b.

The piezoelectric ultrasonic motor driver according to the present invention may also employ a two-phase driving scheme to drive the motor.

Figure 6:
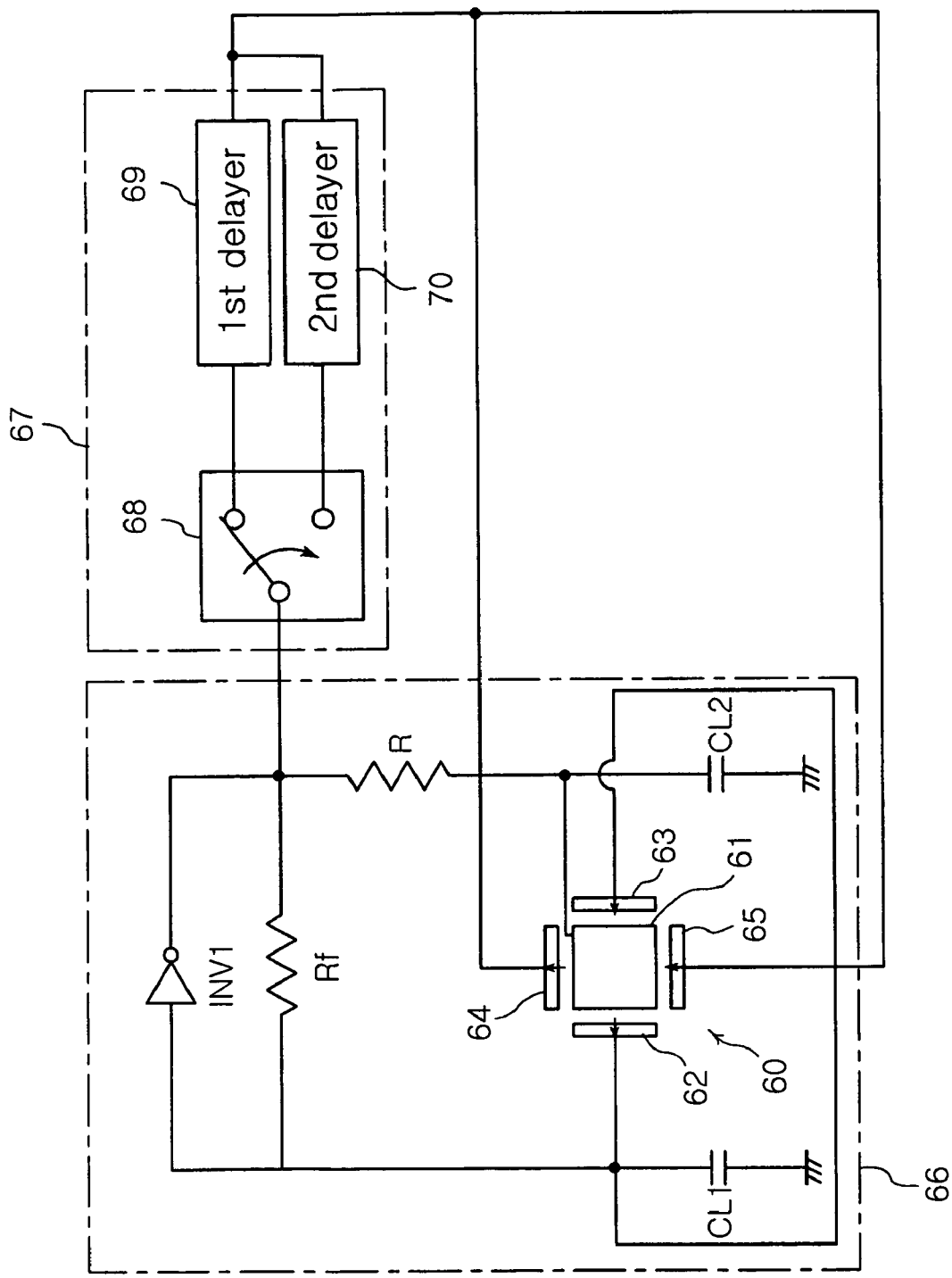
FIG. 6 is a circuit diagram of a piezoelectric ultrasonic motor driver according to another embodiment of the present invention.

FIG. 6 illustrates another embodiment of the piezoelectric ultrasonic motor driver according to the present invention, which uses a two-phase driving scheme.

As shown in FIG. 6, the piezoelectric ultrasonic motor driver comprises a piezoelectric ultrasonic motor 60, a self-oscillation unit 66, and a delay unit 67. The piezoelectric ultrasonic motor 60 includes a metal body 61 and a plurality of piezoelectric plates 62 to 65 attached to outer surfaces of the metal body 61. The self-oscillation unit oscillates at the electromechanical resonant frequency of the piezoelectric plates 62 to 65 so that the frequency of electrical signals applied to the piezoelectric plates is maintained at the electromechanical resonant frequency of the piezoelectric plates. The delay unit 67 delays an oscillation signal of the self-oscillation unit 66 by 90 or −90 degrees according to a desired rotational direction and applies the delayed signal to a specific one of the piezoelectric plates.

Circuitry of the self-oscillation unit 66 and the delay unit 67 slightly differ from that of FIG. 4.

Specifically, the self-oscillation unit 66 comprises first and second capacitors CL1 and CL2, a feedback resistor Rf, and a first inverter INV1. One end of the first capacitor CL1 is connected to both the first and second piezoelectric plates 62 and 63, and the other end is ground. The second capacitor CL2 is connected between the ground and the metal body 61 of the piezoelectric ultrasonic motor 60. The feedback resistor Rf is connected between a node between the first capacitor CL1 and the first and second piezoelectric plates 62 and 63 and a node between the second capacitor CL2 and the metal body 61. The first inverter INV1 is connected in parallel to the feedback resistor Rf. The delay unit 67 comprises a switch 68 and first and second delayers 69 and 70. The switch 68 has a command contact and two selective terminals, and allows an oscillation signal from the self-oscillation unit 66 to be output to one of the two selective terminals according to a requested rotational direction. The first and second delayers 69 and 70 are connected respectively to the two selective terminals of the switch 68. The first and second delayers 69 and 70 delay an electrical signal received through the switch 68 in phase by 90 and −90 degrees, respectively, and provides the delayed signal to the third and fourth piezoelectric plates 64 and 65.

The piezoelectric ultrasonic motor driver shown in FIG. 6 uses a two-phase driving scheme so that the same signal is applied to the same pair of opposing piezoelectric plates (62 and 63) and (64 and 65). The direction of polarization of the first to fourth piezoelectric plates 62 to 65 differs from that of the embodiment of FIG. 4. Specifically, the direction of polarization of each of the first to fourth piezoelectric plates 62 to 65 is from the center of the metal body 61 to the outside or from the outside to the center of the metal body 61, and the first and second piezoelectric plates 62 to 63 have the same direction of polarization, and the third and fourth piezoelectric plates 64 to 65 have the same direction of polarization as shown in FIG. 6.

If electrical signals are applied to the first to fourth piezoelectric plates 62 to 65, the piezoelectric plates 2 to 5 contract and expand to cause a bending deformation of the metal body 1, thereby rotating the central axis of the metal body 1. The other operations of the self-oscillation unit 66 and the delay unit 67 are the same as those of FIG. 4.

In the embodiment of FIG. 6, the piezoelectric ultrasonic motor 60 may also include only two piezoelectric plates. For example, one of the two opposing piezoelectric plates 62 and 63 and one of the other two opposing piezoelectric plates 64 and 65 may be removed from the piezoelectric ultrasonic motor 60 in FIG. 6. In this case, the self-oscillation unit 66 and the delay unit 67 have the same configurations and operations as when the motor 60 includes all the four piezoelectric plates.

Figure 1:
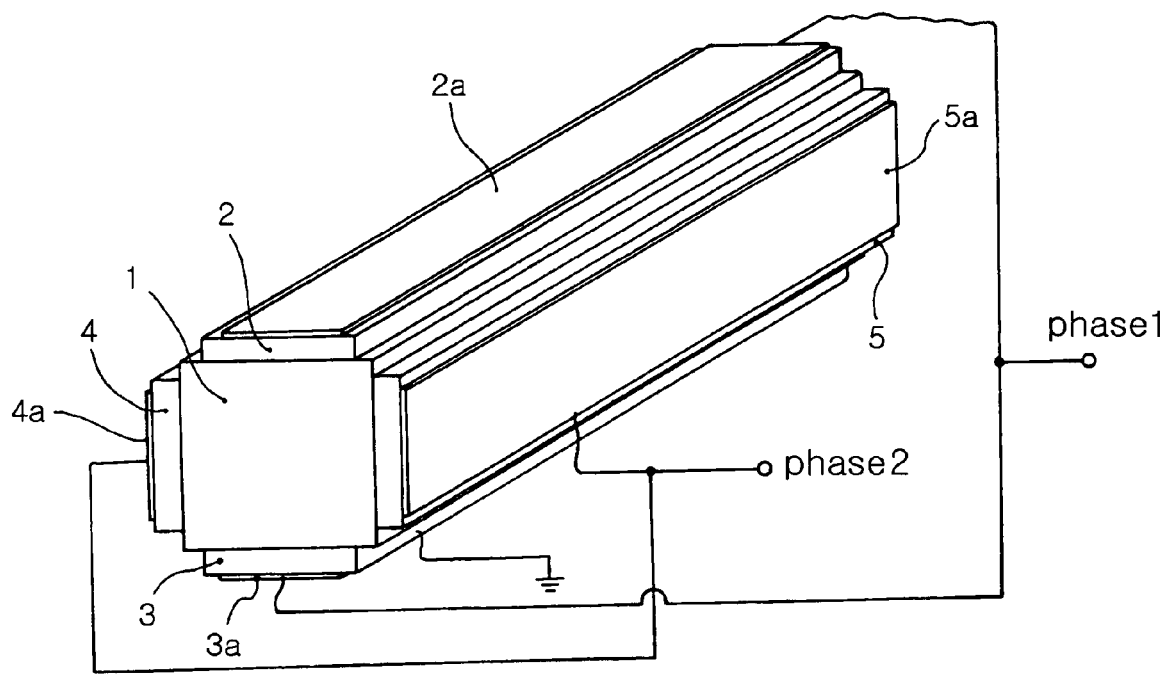
FIG. 1 is a perspective view illustrating a basic structure of a conventional piezoelectric ultrasonic motor.
Figure 2:
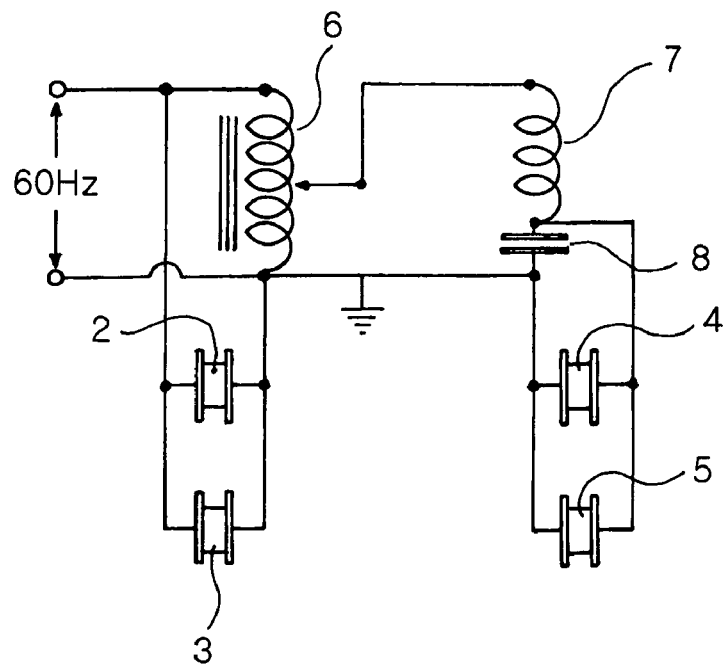
FIG. 2 is a circuit diagram of a conventional piezoelectric ultrasonic motor driver.
Figure 3:
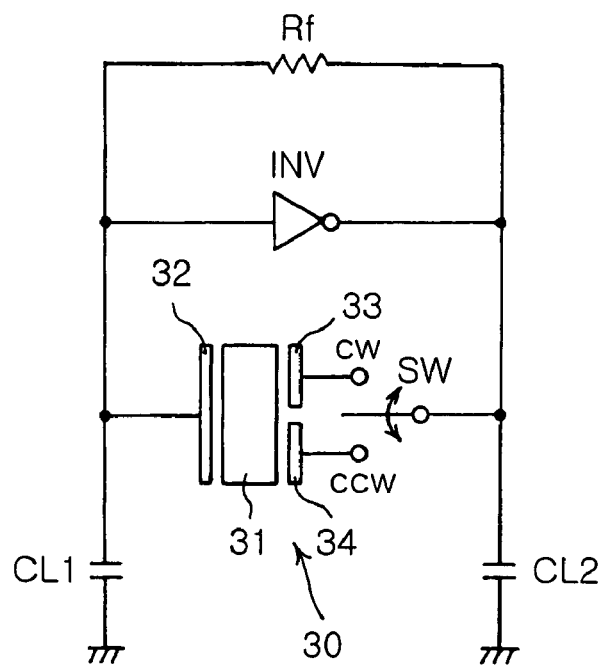
FIG. 3 is a circuit diagram of another conventional piezoelectric ultrasonic motor driver.

As described above, the piezoelectric ultrasonic motor driver according to the present invention is unrestricted in terms of configuration or, as compared to the conventional one shown in FIG. 3. For example, the piezoelectric ultrasonic motor driver according to the present invention can be applied not only to an ultrasonic motor including four piezoelectric plates but also to an ultrasonic motor including two piezoelectric plates.

As is apparent from the above description, a piezoelectric ultrasonic motor driver according to the present invention has the following advantages. Both four-phase and two-phase driving schemes can be applied to the piezoelectric ultrasonic motor driver. By means of self-oscillation, the frequency of signals for driving a piezoelectric ultrasonic motor can be maintained at the electromechanical resonant frequency of piezoelectric plates provided on the piezoelectric ultrasonic motor, so that the maximum efficiency and output can be achieved at any time when the motor is driven. It is also possible for the driver to change the rotational direction simply by changing the phases of electrical signals applied to the piezoelectric plates using a switch and a delay circuit provided in the driver, without changing the structure of the piezoelectric ultrasonic motor. Especially, there is no need to ground a metal body of the piezoelectric ultrasonic motor when the four-phase driving scheme is employed, thereby making it easy to manufacture the driver.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A piezoelectric ultrasonic motor driver comprising:
   a piezoelectric ultrasonic motor including a metal body having a desired shape to serve as a stator, and a plurality of piezoelectric plates attached to surfaces of the metal body, wherein the piezoelectric plates contracts and expands to rotate the metal body if electrical signals are applied to the piezoelectric plates;
   a self-oscillation unit for oscillating at an electromechanical resonant frequency of the piezoelectric plates and allowing a frequency of an electrical signal applied to one of the plurality of piezoelectric plates to be maintained at the electromechanical resonant frequency of the piezoelectric plates; and
   a delay unit for delaying an oscillation signal of the self-oscillation unit in phase by 90 or −90 degrees according to a desired rotational direction, and applying the delayed signal to another of the plurality of piezoelectric plates,
   wherein the plurality of piezoelectric plates include first and second piezoelectric plates opposing each other and third and fourth piezoelectric plates opposing each other, the first to fourth piezoelectric plates being provided on the surfaces of the metal body, and
   wherein the self-oscillation unit comprises:
   a first capacitor provided between the first piezoelectric plate and the ground;
   a second capacitor provided between the second piezoelectric plate and the ground;
   a feedback resistor provided between a node between the first capacitor and the first piezoelectric plate and a node between the second capacitor and the second piezoelectric plate; and
   a first inverter connected in parallel to the feedback resistor, and
   wherein the direction of polarization of the first to fourth piezoelectric plates is from a center of the metal body to the outside.

2. The piezoelectric ultrasonic motor driver according to claim 1, wherein the delay unit comprises:
   a switch for allowing the oscillation signal of the self-oscillation unit to be output to one of the two selective terminals according to a requested rotational direction;
   first and second delayers connected respectively to the two selective terminals of the switch, wherein the first and second delayers delay a voltage signal received through the switch in phase by 90 and −90 degrees, respectively, and provide the delayed signal to the third piezoelectric plate; and
   a second inverter for delaying an electrical signal transferred from the first or second delayer to the third piezoelectric plate in phase by 180 degrees and providing the delayed electrical signal to the fourth piezoelectric plate.

3. The piezoelectric ultrasonic motor driver according to claim 1, wherein the self-oscillation unit further comprises a resistor having a desired resistance, the resistor being provided between the second capacitor, the feedback resistor, and the first inverter.

* * * * *